(12) United States Patent
Luo et al.

(10) Patent No.: US 7,902,309 B2
(45) Date of Patent: Mar. 8, 2011

(54) PROCESS AND CATALYST SYSTEM FOR POLYDIENE PRODUCTION

(75) Inventors: Steven Luo, Copley, OH (US); Jason T. Poulton, Akron, OH (US); Daniel F. Graves, Canal Fulton, OH (US)

(73) Assignee: Bridgestone Corporation (JP)

( * ) Notice: Subject to any disclaimer, the term of this patent is extended or adjusted under 35 U.S.C. 154(b) by 0 days.

(21) Appl. No.: 12/390,857

(22) Filed: Feb. 23, 2009

(65) Prior Publication Data

US 2010/0216956 A1 Aug. 26, 2010

(51) Int. Cl.
C08F 4/44 (2006.01)
(52) U.S. Cl. ........................................ 526/164
(58) Field of Classification Search .............. 526/164
See application file for complete search history.

(56) References Cited

U.S. PATENT DOCUMENTS

| 3,297,667 | A |   | 1/1967 | von Dohlen et al. |
| 3,541,063 | A |   | 11/1970 | Throckmorton et al. |
| 3,794,604 | A |   | 2/1974 | Throckmorton el al. |
| 4,575,538 | A | * | 3/1986 | Hsieh et al. ................ 525/244 |
| 4,696,984 | A |   | 9/1987 | Carbonaro et al. |
| 4,710,553 | A |   | 12/1987 | Carbonaro et al. |
| 4,736,001 | A |   | 4/1988 | Carbonaro et al. |
| 4,906,706 | A |   | 3/1990 | Hattori et al. |
| 4,990,573 | A |   | 2/1991 | Andreussi et al. |
| 5,064,910 | A |   | 11/1991 | Hattori et al. |
| 5,567,784 | A |   | 10/1996 | Wieder et al. |
| 5,844,050 | A |   | 12/1998 | Fukahori et al. |
| 6,759,497 | B2 |   | 7/2004 | Grün et al. |
| 2006/0142508 | A1 | * | 6/2006 | Shamshoum et al. ..... 526/124.2 |

OTHER PUBLICATIONS

Z. Shen et al., J. Polymer Sci.: Polymer Chemistry Edition, 1980, vol. 18, pp. 3345-3357.
H.L. Hsieh et al., Rubber Chemistry and Technology, 1965, vol. 58, pp. 117-145.
D.J. Wilson, J. Polymer Sci., Part A, Polymer Chemistry, 1995, vol. 33, pp. 2505-2513.
R.P. Quirk et al., Polymer International, 2000, vol. 49, pp. 751-756.

* cited by examiner

*Primary Examiner* — David Wu
*Assistant Examiner* — Sonya Wright
(74) *Attorney, Agent, or Firm* — Meredith E. Hooker; Kameron Kelly

(57) ABSTRACT

Compositions and polydiene production processes involving catalyst systems comprising at least one lanthanide-containing compound, at least one alkylating agent, at least one halogen source, and at least one N,N-dihydrocarbylhydroxylamine.

33 Claims, No Drawings

PROCESS AND CATALYST SYSTEM FOR POLYDIENE PRODUCTION

BACKGROUND OF THE INVENTION

1. Field of the Invention

One or more embodiments of the present invention relate to processes for producing polydienes and lanthanide-based catalyst systems useful in polydiene production processes.

2. Description of Related Art

Catalyst systems comprising lanthanide compounds are known to be useful for polymerizing conjugated dienes. Such catalyst systems can be stereospecific and, to some extent, can selectively produce cis-1,4-polydienes or trans-1,4-polydienes, depending on the specific catalyst system. For example, a catalyst system including a lanthanide-containing compound, an alkylating agent, and a halogen-containing compound can be useful in producing cis-1,4-polydienes from various conjugated diene monomers. These catalyst systems are also capable of copolymerizing different types of conjugated diene monomers to give stereoregular cis-1,4-copolydienes.

Cis-1,4-polydienes produced by lanthanide-based catalyst systems have a linear backbone structure and exhibit good green strength and excellent viscoelastic properties. The linear backbone structure is believed to improve the tensile properties and abrasion and fatigue resistance, and to reduce hysteresis loss of rubber compounds. Therefore, these polydienes are particularly suited for use in tire components, such as sidewall and tread. However, despite advances in catalyst systems to produce such polydienes, improvements are still needed.

SUMMARY OF THE INVENTION

One embodiment of the present invention concerns a catalyst system comprising: (a) at least one lanthanide-containing compound, (b) at least one alkylating agent, (c) at least one halogen source, and (d) at least one N,N-dihydrocarbylhydroxylamine.

Another embodiment of the present invention concerns a process for preparing a polydiene. The process of this embodiment comprises: polymerizing at least one conjugated diene monomer in a polymerization system comprising the conjugated diene monomer and a catalyst system to thereby produce the polydiene. The catalyst system of this embodiment comprises at least one lanthanide-containing compound, at least one alkylating agent, at least one halogen source, and at least one N,N-dihydrocarbylhydroxylamine.

DETAILED DESCRIPTION

In accordance with one embodiment of the present invention, catalyst systems are provided comprising at least one lanthanide-containing compound, at least one alkylating agent, at least one halogen source, and at least one N,N-dihydrocarbylhydroxylamine. The catalyst systems of the present invention can be employed in polymerizing one or more types of conjugated diene monomers to thereby form a polydiene. In other embodiments, a compound containing a non-coordinating anion or a non-coordinating anion precursor can be employed in lieu of a halogen source. In this or other embodiments, other organometallic compounds, Lewis bases, and/or catalyst modifiers can be employed in addition to the ingredients or components set forth above. For example, in one embodiment, a nickel-containing compound can be employed as a molecular weight regulator as disclosed in U.S. Pat. No. 6,699,813, which is incorporated herein by reference in its entirety.

As mentioned above, the catalyst systems of the present invention can comprise at least one lanthanide-containing compound. Lanthanide-containing compounds useful in the present invention are those compounds that include at least one atom of lanthanum, neodymium, cerium, praseodymium, promethium, samarium, europium, gadolinium, terbium, dysprosium, holmium, erbium, thulium, ytterbium, lutetium, and didymium. In one embodiment, these compounds can include neodymium, lanthanum, samarium, or didymium. As used herein, the term "didymium" shall denote a commercial mixture of rare-earth elements obtained from monazite sand. In addition, the lanthanide-containing compounds useful in the present invention can be in the form of elemental lanthanide.

The lanthanide atom in the lanthanide-containing compounds can be in various oxidation states including, but not limited to, the 0, +2, +3, and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art will be able to select similar compounds that are based upon other lanthanide metals.

As mentioned above, lanthanide-containing compounds employed in the present invention can comprise lanthanide carboxylates, such as, for example, a neodymium carboxylate. Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a., neodymium versatate), neodymium naphthenate, neodymium stearate, neodymium oleate, neodymium benzoate, and neodymium picolinate.

As mentioned above, lanthanide-containing compounds employed in the present invention can comprise lanthanide organophosphates, such as, for example, a neodymium organophosphate. Suitable neodymium organophosphates include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl)phosphate, neodymium (1-methylheptyl) (2-ethylhexyl)phosphate, and neodymium(2-ethylhexyl) (p-nonylphenyl) phosphate.

As mentioned above, lanthanide-containing compounds employed in the present invention can comprise lanthanide organophosphonates, such as, for example, a neodymium organophosphonate. Suitable neodymium organophosphonates include, but are not limited to, neodymium butyl phosphonate, neodymium pentyl phosphonate, neodymium hexyl phosphonate, neodymium heptyl phosphonate, neodymium octyl phosphonate, neodymium(1-methylheptyl)phosphonate, neodymium(2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium(p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium(1-methylheptyl) (1-methylheptyl)phosphonate, neodymium(2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium(p-nonylphenyl) (p-nonylphenyl)phosphonate, neodymium butyl(2-ethylhexyl)phosphonate, neodymium(2-ethylhexyl)butylphosphonate, neodymium(1-methylheptyl) (2-ethylhexyl)phosphonate, neodymium(2-ethylhexyl) (1-methylheptyl) phosphonate, neodymium(2-ethylhexyl) (p-nonylphenyl) phosphonate, and neodymium(p-nonylphenyl) (2-ethylhexyl)phosphonate.

As mentioned above, lanthanide-containing compounds employed in the present invention can comprise lanthanide organophosphinates, such as, for example, a neodymium organophosphinate. Suitable neodymium organophosphinates include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium(p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl) phosphinate, neodymium butyl (2-ethylhexyl)phosphinate, neodymium(1-methylheptyl)(2-ethylhexyl)phosphinate, and neodymium(2-ethylhexyl)(p-nonylphenyl)phosphinate.

As mentioned above, lanthanide-containing compounds employed in the present invention can comprise lanthanide carbamates, such as, for example, a neodymium carbamate. Suitable neodymium carbamates include, but are not limited to, neodymium dimethylcarbamate, neodymium diethylcarbamate, neodymium diisopropylcarbamate, neodymium dibutylcarbamate, and neodymium dibenzylcarbamate.

As mentioned above, lanthanide-containing compounds employed in the present invention can comprise lanthanide dithiocarbamates, such as, for example, a neodymium dithiocarbamate. Suitable neodymium dithiocarbamates include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

As mentioned above, lanthanide-containing compounds employed in the present invention can comprise lanthanide xanthates, such as, for example, a neodymium xanthate. Suitable neodymium xanthates include, but are not limited to, neodymium methylxanthate, neodymium ethylxanthate, neodymium isopropylxanthate, neodymium butylxanthate, and neodymium benzylxanthate.

As mentioned above, lanthanide-containing compounds employed in the present invention can comprise lanthanide β-diketonates, such as, for example, a neodymium β-diketonate. Suitable neodymium β-diketonates include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

As mentioned above, lanthanide-containing compounds employed in the present invention can comprise lanthanide alkoxides or aryloxides, such as, for example, a neodymium alkoxide or a neodymium aryloxide. Suitable neodymium alkoxides or aryloxides include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

As mentioned above, lanthanide-containing compounds employed in the present invention can comprise lanthanide halides, pseudo-halides or oxyhalides, such as, for example, a neodymium halide, a neodymium pseudo-halide, or a neodymium oxyhalide. Suitable neodymium halides include, but are not limited to, neodymium fluoride, neodymium chloride, neodymium bromide, and neodymium iodide. Suitable neodymium pseudo-halides include, but are not limited to, neodymium cyanide, neodymium cyanate, neodymium thiocyanate, neodymium azide, and neodymium ferrocyanide. Suitable neodymium oxyhalides include, but are not limited to, neodymium oxyfluoride, neodymium oxychloride, and neodymium oxybromide. A Lewis base, such as tetrahydrofuran ("THF"), may be employed as an aid for solubilizing this class of neodymium compounds in inert organic solvents. Where lanthanide halides, lanthanide oxyhalides, or other lanthanide-containing compounds containing labile halogen atoms are employed, the lanthanide-containing compound may also serve as all or part of the halogen source in the above-mentioned catalyst system.

As mentioned above, lanthanide-containing compounds employed in the present invention can comprise an organolanthanide compound. As used herein, the term "organolanthanide compound" refers to any lanthanide-containing compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds include, but are not limited to, $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group. As used herein, the term "hydrocarbyl" shall denote a mono-valent group formed by removing a hydrogen atom from a hydrocarbon. In one or more embodiments, hydrocarbyl groups useful in the present invention may contain heteroatoms such as, for example, nitrogen, oxygen, boron, silicon, sulfur, and phosphorus atoms.

As mentioned above, the catalyst systems of the present invention can comprise one or more alkylating agents. Alkylating agents, which may also be referred to as hydrocarbylating agents, are organometallic compounds that can transfer one or more hydrocarbyl groups to another metal. Typically, these agents are organometallic compounds of electropositive metals such as Groups 1, 2, and 3 metals (Groups IA, IIA, and IIIA metals). Alkylating agents useful in the present invention include, but are not limited to, organoaluminum and organomagnesium compounds. As used herein, the term "organoaluminum compound" refers to any aluminum compound containing at least one aluminum-carbon bond. In one embodiment, organoaluminum compounds that are soluble in a hydrocarbon solvent can be employed. As used herein, the term "organomagnesium compound" refers to any magnesium compound that contains at least one magnesium-carbon bond. In one embodiment, organomagnesium compounds that are soluble in a hydrocarbon can be employed. As will be described in more detail below, several species of suitable alkylating agents can be in the form of a halide. Where the alkylating agent includes a labile halogen atom, the alkylating agent may also serve as all or part of the halogen source in the above-mentioned catalyst system.

As mentioned above, alkylating agents useful in the present invention can comprise organoaluminum compounds. In one embodiment of the present invention, a class of organoaluminum compounds that can be utilized is represented by the general formula $AlR_nX_{3-n}$, where each R independently can be a mono-valent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3, inclusive. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of organoaluminum compounds useful in the present invention that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds.

As mentioned above, alkylating agents employed in the present invention can comprise trihydrocarbylaluminum compounds. Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

As mentioned above, alkylating agents employed in the present invention can comprise dihydrocarbylaluminum hydride compounds. Suitable dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride. In one embodiment, when the alkylating agent includes an organoaluminum hydride compound, the above-mentioned halogen source can be provided by a tin halide, as disclosed in U.S. Pat. No. 7,008,899, which is incorporated herein by reference in its entirety.

As mentioned above, alkylating agents employed in the present invention can comprise hydrocarbylaluminum dihydride compounds. Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

As mentioned above, alkylating agents employed in the present invention can comprise dihydrocarbylaluminum halide compounds. Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

As mentioned above, alkylating agents employed in the present invention can comprise hydrocarbylaluminum dihalide compounds. Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds useful as alkylating agents in the present invention that are represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the present invention is aluminoxanes. Aluminoxanes can comprise oligomeric linear aluminoxanes, which can be represented by the general formula:

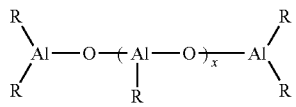

and oligomeric cyclic aluminoxanes, which can be represented by the general formula:

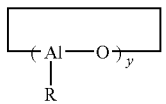

where x can be an integer in the range of from 1 to about 100, or about 10 to about 50; y can be an integer in the range of from 2 to about 100, or about 3 to about 20; and where each R independently can be a mono-valent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalyst systems utilizing aluminoxanes.

Aluminoxanes useful in the present invention can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 20 to 80 percent of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Patent Application Ser. No. 60/877,535, which is incorporated herein by reference in its entirety, provides other examples where aluminoxanes and organoaluminum compounds can be employed in combination.

As mentioned above, alkylating agents useful in the present invention can comprise organomagnesium compounds. In one embodiment of the present invention, a class of organomagnesium compounds that can be utilized is represented by the general formula $MgR_2$, where each R independently can be a mono-valent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Specific examples of organomagnesium compounds useful in the present invention that are represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent in the present invention is represented by the general formula RMgX, where R can be a mono-valent organic group that is attached to the magnesium atom via a carbon atom, and X can be a hydrogen atom, a halogen atom, a carboxylate group, an alkoxide group, or an aryloxide group. Where the alkylating agent is an organomagnesium compound that includes a labile halogen atom, the organomagnesium compound can serve as both the alkylating agent and at least a portion of the halogen source in the catalyst systems of the present invention. In one embodiment, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds useful in the present invention that are represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Specific examples of organomagnesium compounds useful in the present invention that are represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

As indicated above, the catalyst systems of the present invention can comprise a halogen source. As used herein, the term "halogen source" shall denote any substance comprising at least one labile halogen atom. In one embodiment, at least a portion of the halogen source can be provided by either the above-described lanthanide-containing compound and/or the above-described alkylating agent, when those compounds contain at least one labile halogen atom. In other words, the lanthanide-containing compound can serve as both the lanthanide-containing compound and at least a portion of the halogen source. Similarly, the alkylating agent can serve as both the alkylating agent and at least a portion of the halogen source.

In another embodiment, at least a portion of the halogen source can be present in the catalyst systems in the form of a separate and distinct halogen-containing compound. Various compounds, or mixtures thereof, that contain one or more labile halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Useful types of halogen-containing compounds that can be employed as at least a portion of the halogen source include, but are not limited to, elemental halogens, mixed halogens, hydrogen halides, organic halides, inorganic halides, metallic halides, and organometallic halides.

As mentioned above, elemental halogens can be employed as at least a portion of the halogen source in one or more embodiments of the present invention. Elemental halogens suitable for use in the present invention include, but are not limited to, fluorine, chlorine, bromine, and iodine. Some specific examples of suitable mixed halogens include iodine monochloride, iodine monobromide, iodine trichloride, and iodine pentafluoride.

As mentioned above, hydrogen halides can be employed as at least a portion of the halogen source in one or more embodiments of the present invention. Hydrogen halides suitable for use in the present invention include, but are not limited to, hydrogen fluoride, hydrogen chloride, hydrogen bromide, and hydrogen iodide.

As mentioned above, organic halides can be employed as at least a portion of the halogen source in one or more embodiments of the present invention. Organic halides suitable for use in the present invention include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

As mentioned above, inorganic halides can be employed as at least a portion of the halogen source in one or more embodiments of the present invention. Inorganic halides suitable for use in the present invention include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

As mentioned above, metallic halides can be employed as at least a portion of the halogen source in one or more embodiments of the present invention. Metallic halides suitable for use in the present invention include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

As mentioned above, organometallic halides can be employed as at least a portion of the halogen source in one or more embodiments of the present invention. Organometallic halides suitable for use in the present invention include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

As indicated above, the catalyst systems of the present invention can comprise an N,N-dihydrocarbylhydroxylamine. In one embodiment, N,N-dihydrocarbylhydroxylamine compounds suitable for use in the present invention can be represented by the following formula:

(I)

where $R^1$ and $R^2$ are each independently hydrocarbyl or substituted hydrocarbyl groups including, but not limited to, alkyl, cycloalkyl, alkenyl, cycloalkenyl, aryl, allyl, aralkyl, alkaryl, or alkynyl groups. Specific examples of N,N-dihydrocarbylhydroxylamine compounds represented by formula (I) that are useful in the present invention include, but are not limited to, N,N-dimethylhydroxylamine, N,N-diethylhydroxylamine, N,N-di-n-propylhydroxylamine, N,N-diisopropylhydroxylamine, N,N-di-n-butylhydroxylamine, N,N-diisobutylhydroxylamine, N,N-di-t-butylhydroxylamine, N,N-di-n-hexylhydroxylamine, N,N-di-n-octylhydroxylamine, N,N-bis(2-ethylhexyl)hydroxylamine, N,N-dicyclopentylhydroxylamine, N,N-dicyclohexylhydroxylamine, N,N-diphenylhydroxylamine, and N,N-di-p-tolylhydroxylamine. In one embodiment, the catalyst system comprises N,N-diethylhydroxylamine.

In another embodiment, N,N-dihydrocarbylhydroxylamine compounds suitable for use in the present invention can be represented by the following formula:

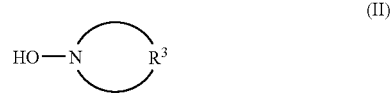
(II)

where $R^3$ is a hydrocarbylene or substituted hydrocarbylene group including, but not limited to, alkylene, cycloalkylene, alkenylene, cycloalkenylene, alkynylene, cycloalkynylene, or arylene groups. As used herein, the term "hydrocarbylene" shall denote a divalent group formed by removing two hydrogen atoms from a hydrocarbon, the free valencies of which are not engaged in a double bond. Specific examples of N,N-dihydrocarbylhydroxylamine compounds represented by formula (II) that are useful in the present invention include, but are not limited to, 1-hydroxypyrrolidine, 1-hydroxypiperidine, 4-hydroxymorpholine, 1-hydroxyhomopiperidine, 1-hydroxy-4-methylpiperazine, and 1-hydroxy-4-methylhomopiperazine.

In another embodiment of the present invention, the above-described catalyst systems can comprise a compound containing a non-coordinating anion, or a non-coordinating anion precursor. In one or more embodiments, a compound containing a non-coordinating anion, or a non-coordinating anion precursor can be employed in lieu of the above-described halogen source. A non-coordinating anion is a sterically bulky anion that does not form coordinate bonds with, for example, the active center of a catalyst system due to steric hindrance. Non-coordinating anions useful in the present invention include, but are not limited to, tetraarylborate anions and fluorinated tetraarylborate anions. Compounds containing a non-coordinating anion can also contain a counter cation, such as a carbonium, ammonium, or phosphonium cation. Exemplary counter cations include, but are not limited to, triarylcarbonium cations and N,N-dialkylanilinium cations. Examples of compounds containing a non-coordinating anion and a counter cation include, but are not limited to, triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

As mentioned above, a non-coordinating anion precursor can also be used in this embodiment. A non-coordinating anion precursor is a compound that is able to form a non-coordinating anion under reaction conditions. Useful non-coordinating anion precursors include, but are not limited to, triarylboron compounds, $BR_3$, where R is a strong electron-withdrawing aryl group, such as a pentafluorophenyl or 3,5-bis(trifluoromethyl)phenyl group.

As mentioned above, the catalyst systems of the present invention can be employed to aid in polymerizing conjugated diene monomers. The catalyst systems of this invention have very high catalytic activity for polymerizing conjugated dienes into stereospecific polydienes over a wide range of catalyst concentrations and catalyst ingredient ratios. The polymers having the most desirable properties, however, are obtained within a narrower range of catalyst concentrations and catalyst ingredient ratios. Further, though not wishing to be bound by theory, it is believed that the catalyst ingredients described above may interact to form an active catalyst species. Accordingly, the optimum concentration for any one catalyst ingredient is dependent upon the concentrations of the other catalyst ingredients. Thus, in one embodiment of the present invention, the molar ratio of the N,N-dihydrocarbylhydroxylamine compound to the lanthanide-containing compound (DHCA/Ln) can be in the range of from about 0.01:1 to about 10:1, in the range of from about 0.05:1 to about 5:1, in the range of from about 0.2:1 to about 2:1, or in the range of from 0.3:1 to 1:1. The molar ratio of the alkylating agent to the lanthanide-containing compound (alkylating agent/Ln) can be in the range of from about 1:1 to about 200:1, in the range of from about 2:1 to about 100:1, or in the range of from 5:1 to 50:1. In those embodiments where both an aluminoxane and at least one other organoaluminum agent are employed as alkylating agents, the molar ratio of the aluminoxane to the lanthanide compound (aluminoxane/Ln) can be in the range of from about 5:1 to about 1,000:1, from about 10:1 to about 700:1, or from 20:1 to 500:1; and the molar ratio of the at least one other organoaluminum compound to the lanthanide compound (Al/Ln) can be in the range of from about 1:1 to about 200:1, from about 2:1 to about 150:1, or from 5:1 to 100:1. The molar ratio of the halogen source to the lanthanide-containing compound (halogen atom/Ln) can be in the range of from about 0.5:1 to about 20:1, in the range of from about 1:1 to about 10:1, or in the range of from 2:1 to 6:1. The molar ratio of non-coordinating anion or non-coordinating anion precursor to lanthanide-containing compound (An/Ln) can be in the range of from about 0.5:1 to about 20:1, from about 0.75:1 to about 10:1, or from 1:1 to 6:1. The term "molar ratio," as used herein, refers to the equivalent ratio of relevant components of the ingredients (e.g., equivalents of halogen atoms in the halogen source to lanthanide atoms in the lanthanide-containing compound).

The catalyst systems of the present invention can be formed by combining or mixing the above-described catalyst ingredients. Although an active catalyst species is believed to result from this combination, the degree of interaction or reaction between the various ingredients or components is not known with any great degree of certainty. Therefore, the term "catalyst system," as used herein, is intended to encompass a simple mixture of the ingredients, a complex of the various ingredients that is caused by physical or chemical forces of attraction, a chemical reaction product of the ingredients, or any combination thereof.

The catalyst systems of this invention can be formed by any known method in the art for preparing a catalyst system. The following are examples of methods that can be employed for preparing the catalyst systems of the present invention.

In one embodiment, the catalyst systems can be formed in situ by adding the catalyst ingredients to a solution containing monomer and solvent, or simply bulk monomer, in either a stepwise or simultaneous manner. In one embodiment, the alkylating agent can be added first, followed by the lanthanide-containing compound, followed by the N,N-dihydrocarbylhydroxylamine, and then followed by the halogen-containing compound, the compound containing a non-coordinating anion, and/or the non-coordinating anion precursor, if used.

In another embodiment, the catalyst ingredients can be pre-mixed outside the polymerization system at an appropriate temperature, which can be in the range of from about −20 to about 80° C., and the resulting catalyst system can then be added to the polymerization system.

In another embodiment, the catalyst system can be pre-formed in the presence of at least one monomer, which can be a conjugated diene monomer. The catalyst ingredients can be pre-mixed in the presence of a small amount of conjugated diene monomer at an appropriate temperature, which can be in the range of from about −20 to about 80° C. The amount of monomer that is used for pre-forming the catalyst system can range from about 1 to about 500 moles, from about 5 to about 250 moles, or from 10 to 100 moles per mole of lanthanide atoms in the lanthanide-containing compound. The resulting catalyst system can then be added to the remainder of the monomer that is to be polymerized. The resulting preformed catalyst system can be aged, if desired, prior to being added to the monomer that is to be polymerized.

In another embodiment, the catalyst system can be formed by using a two-stage procedure. The first stage involves combining the alkylating agent with the lanthanide-containing compound in the absence of monomer or in the presence of a small amount of monomer at an appropriate temperature, which can be from about −20 to about 80° C. In the second stage, the foregoing mixture and the remaining catalyst components are charged in either a stepwise or simultaneous manner to the remainder of the monomer that is to be polymerized.

In another embodiment, the catalyst system can be formed by using a different two-stage procedure. The first stage involves combining the alkylating agent with the lanthanide-containing compound and the N,N-dihydrocarbylhydroxylamine compound in the absence of monomer or in the presence of a small amount of monomer at an appropriate temperature, which can be from about −20 to about 80° C. In the second stage, the foregoing mixture and the halogen-containing compound, the compound containing a non-coordinating anion, and/or the non-coordinating anion precursor, if employed, are charged in either a stepwise or simultaneous manner to the remainder of the monomer that is to be polymerized.

In one or more embodiments, a solvent can be employed as a carrier to either dissolve or suspend the catalyst or catalyst ingredients in order to facilitate the delivery of the catalyst or catalyst ingredients to the polymerization system. In other embodiments, conjugated diene monomer can be used as a catalyst carrier. In yet other embodiments, the catalyst ingredients can be used in their neat state without any solvent.

Organic solvents useful in one or more embodiments of the present invention can be inert to the catalyst system. Additionally, useful organic solvents include those that will not undergo polymerization or incorporation into propagating polymer chains during the polymerization of monomer in the presence of the catalyst system. Moreover, organic solvents useful in the present invention can be liquid at ambient temperature and pressure.

In one or more embodiments, useful organic solvents can have low or relatively low boiling points. Organic solvents suitable for use in the present invention include, but are not limited to, hydrocarbon solvents such as aromatic hydrocarbons, aliphatic hydrocarbons, and cycloaliphatic hydrocarbons. Specific examples of aromatic hydrocarbon solvents include, but are not limited to, benzene, toluene, xylenes, ethylbenzene, diethylbenzene, and mesitylene. Specific examples of aliphatic hydrocarbon solvents include, but are not limited to, n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. Specific examples of cycloaliphatic hydrocarbon solvents include, but are not limited to, cyclopentane, cyclohexane, methylcyclopentane, and methylcyclohexane. Mixtures of the above hydrocarbons may also be used. The low-boiling hydrocarbon solvents can be separated from the polymer upon completion of the polymerization.

Other examples of organic solvents include, but are not limited to, high-boiling hydrocarbons of high molecular weights, such as paraffinic oil, aromatic oil, or other hydrocarbon oils that are commonly used to oil-extend polymers. Since these hydrocarbons are non-volatile, they can remain incorporated in the polymer.

As indicated above, the catalyst systems of the present invention can be employed in polymerizing conjugated diene monomers into polydienes. In particular, the catalyst systems of this invention exhibit very high catalytic activity for polymerizing conjugated diene monomers into cis-1,4-polydienes. Although one embodiment is directed toward the polymerization of 1,3-butadiene into cis-1,4-polybutadiene, other conjugated diene monomers can also be polymerized. Some specific examples of other conjugated diene monomers contemplated by the present invention include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated diene monomers may also be utilized in copolymerization.

The production of polydienes according to the present invention can be accomplished by polymerizing conjugated diene monomer in the presence of a catalytically effective amount of the above-described catalyst system. The total catalyst concentration to be employed in the polymerization mass depends on the interplay of various factors, such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients should be used. Generally, however, the amount of the lanthanide-containing compound used can be varied from about 0.01 to about 2 mmol, from about 0.02 to about 1 mmol, or from 0.05 to 0.5 mmol per 100 g of conjugated diene monomer. As described above, the concentrations of the remaining catalyst components are varied in relation to the amount of lanthanide-containing compound employed.

The polymerization can be carried out in an organic solvent as the diluent. In one embodiment, a solution polymerization system can be employed, which is a system where the monomer to be polymerized and the polymer formed are soluble in the polymerization medium. Alternatively, a precipitation polymerization system can be employed by choosing a solvent in which the polymer formed is insoluble. In both cases, the monomer to be polymerized is in a condensed phase. Also, the catalyst ingredients can be solubilized or suspended within the organic solvent. In other words, the catalyst ingredients do not have to be impregnated onto a catalyst support. When either a solution or precipitation polymerization system is employed, the solvent content of the polymerization system can be at least 20 percent by weight, at least 50 percent by weight, or at least 80 percent by weight based on the total weight of the polymerization system.

In performing these polymerizations, an additional amount of organic solvent (i.e., in addition to the amount of organic solvent that can be used in preparing the above-described catalyst system) can be added to the polymerization system. The additional organic solvent can be the same as or different from the organic solvent optionally used in preparing the catalyst system. In one embodiment, an organic solvent that is inert with respect to the catalyst system employed to catalyze the polymerization can be used. The additional organic solvent can be selected from the solvents described above as suitable for optional use in forming the catalyst system. When a solvent is employed in the polymerization system, the concentration of the monomer to be polymerized is not limited to a particular range. In one embodiment, however, the concentration of the monomer present in the polymerization system at the beginning of the polymerization can be in a range of from about 3 to about 80 percent by weight, in the range of from about 5 to about 50 percent by weight, or in the range of from 10 to 30 percent by weight based on the total weight of the polymerization system.

In another embodiment, the polymerization of conjugated dienes can be performed by bulk polymerization. As used herein, the term "bulk polymerization" shall denote a polymerization environment where minimal or substantially no solvents are employed. In one embodiment, the amount of solvent present when a bulk polymerization system is employed can be less than 20 percent by weight, less than 10 percent by weight, or less than 5 percent by weight based on the total weight of the polymerization system. In another embodiment, the bulk polymerization system can contain no solvents other than those that are inherently present in the raw materials employed. In still another embodiment, the bulk polymerization system can be substantially devoid of solvent, which refers to the absence of that amount of solvent that would otherwise have an appreciable impact on the bulk polymerization process. In yet another embodiment, the bulk polymerization system can be devoid of solvent. The bulk polymerization can be conducted either in a condensed liquid phase or in a gas phase. Examples of useful bulk polymerization processes include, but are not limited to, those disclosed in U.S. Pat. No. 7,351,776, which is incorporated herein by reference in its entirety.

The polymerization can be conducted in any conventional polymerization vessel known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60 percent. In still other embodiments, particularly where the monomer conversion in a bulk polymerization process is higher than about 60 percent, which can result in a highly viscous cement, the bulk polymerization can be conducted in an elongated reactor in which movement of the viscous cement under polymerization can be assisted by piston or substantially by piston. For example, extruders in which the cement is pushed along by a self-cleaning single-screw or double-screw agitator are suitable for this purpose.

In one or more embodiments, all of the ingredients used for the polymerization can be combined within a single vessel (e.g., a conventional stirred-tank reactor), and all the steps of the polymerization process can be conducted within this vessel. In another embodiment, two or more of the ingredients can be pre-combined in one vessel and then transferred to another vessel where the polymerization (or at least a portion thereof) can be conducted.

The polymerization of conjugated dienes may be carried out as a batch process, a continuous process, or a semi-continuous process. In a semi-continuous process, monomer is intermittently charged as needed to replace that monomer already polymerized. In any case, the polymerization can be conducted under anaerobic conditions by using an inert protective gas such as nitrogen, argon or helium, with moderate to vigorous agitation. The polymerization temperature may vary widely from a low temperature, such as $-10°$ C. or below, to a high temperature such as $200°$ C or above. In one or more embodiments, the polymerization temperature can be in the range of from about 0 to about $150°$ C, or from 20 to $100°$ C. The heat of polymerization can be removed by external cooling by a thermally controlled reactor jacket, cooling by evaporation of the monomer or the solvent, or a combination of the two methods. Although the polymerization pressure employed may vary widely, in one or more embodiments, the polymerization pressure can range from about 0.1 to about 50 atmospheres, from about 0.5 to about 20 atmospheres, or from 1 to 10 atmospheres. In one or more embodiments, the pressure employed during polymerization can be selected so as to ensure that the majority of the monomer remains in the liquid phase.

The polydienes produced by the polymerization process of this invention can possess pseudo-living characteristics, such that at least a portion of polymer chains in these polymers have reactive chain ends. Once a desired monomer conversion is achieved, a functionalizing agent can optionally be introduced into the polymerization mixture to react with any reactive polymer chains so as to yield a functionalized polymer. In one or more embodiments, the functionalizing agent can be introduced prior to contacting the polymerization mixture with a quenching agent, described below. In other embodiments, the functionalizing may be introduced after the polymerization mixture has been partially quenched with a quenching agent.

Functionalizing agents useful in the present invention include compounds or reagents that can react with a reactive polymer produced by this invention to thereby provide the polymer with a functional group that is distinct from a propagating chain that has not been reacted with the functionalizing agent. The functional group may be reactive or interactive with other polymer chains (propagating and/or non-propagating) or with other constituents, such as reinforcing fillers (e.g. carbon black), that can be combined with the polymer. In one or more embodiments, the reaction between the functionalizing agent and the reactive polymer proceeds via an addition or substitution reaction.

Useful functionalizing agents may include compounds that simply provide a functional group at the end of a polymer chain without joining two or more polymer chains together, as well as compounds that can couple or join two or more polymer chains together via a functional linkage to form a single macromolecule. The latter type of functionalizing agents may also be referred to as coupling agents.

In one or more embodiments, functionalizing agents include compounds that can add or impart a heteroatom to the polymer chain. In one embodiment, functionalizing agents include those compounds that can impart a functional group to the polymer chain to form a functionalized polymer that reduces the 50° C. hysteresis loss of a carbon-black filled vulcanizate prepared from the functionalized polymer as compared to similar carbon-black filled vulcanizates prepared from non-functionalized polymer. In one or more embodiments, this reduction in hysteresis loss is at least 5 percent, at least 10 percent, or at least 15 percent.

In one or more embodiments, suitable functionalizing agents include those compounds that contain groups that may react with pseudo-living polymers (e.g., those produced in accordance with this invention). Examples of functionalizing agents suitable for use in the present invention include, but are not limited to, ketones, quinones, aldehydes, amides, esters, isocyanates, isothiocyanates, epoxides, imines, aminoketones, aminothioketones, and acid anhydrides. Examples of specific types of these compounds can be found in U.S. Pat. Nos. 4,906,706, 4,990,573, 5,064,910, 5,567,784, 5,844,050, 6,838,526, 6,977,281, and 6,992,147; U.S. Patent Application Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; each of which is incorporated herein by reference in its entirety. Other examples of functionalizing agents include azine compounds, such as those described in U.S. patent application Ser. No. 11/640,711, hydrobenzamide compounds, such as those described in U.S. patent application Ser. No. 11/710,713, nitro compounds, such as those described in U.S. patent application Ser. No. 11/710,845, and protected oxime compounds, such as those described in U.S. Patent Application Ser. No. 60/875,484. Each of U.S. patent application Ser. Nos. 11/640,711, 11/710,713, 11/710,845, and 60/875,484 is incorporated herein by reference in its entirety.

In one or more embodiments, the functionalizing agents employed can be coupling agents which include, but are not limited to, metal halides such as, for example, tin tetrachloride; metalloid halides, such as, for example, silicon tetrachloride; metal ester-carboxylate complexes, such as, for example, dioctyltin bis(octylmaleate); alkoxysilanes, such as, for example, tetraethyl orthosilicate; and alkoxystannanes, such as, for example, tetraethoxytin. Coupling agents can be employed either alone or in combination with other functionalizing agents. The combination of functionalizing agents may be used in any molar ratio.

The amount of functionalizing agent introduced to the polymerization mixture depends upon various factors including the type and amount of catalyst used to initiate the polymerization, the type of functionalizing agent, the desired level of functionality and many other factors. In one or more embodiments, the amount of functionalizing agent may be in the range of from about 1 to about 200 moles, from about 5 to about 150 moles, or from 10 to 100 moles per mole of lanthanide atoms in the lanthanide-containing compound.

Because reactive polymer chains may slowly self-terminate at high temperatures, in one embodiment the functionalizing agent can be added to the polymerization mixture once a peak polymerization temperature is observed. In other embodiments, the functionalizing agent can be added within about 25 to about 35 minutes after the peak polymerization temperature is reached.

In one or more embodiments, the functionalizing agent may be introduced to the polymerization mixture after a desired monomer conversion has been achieved but before a quenching agent, described below, is added. In one or more embodiments, the functionalizing agent can be added to the polymerization mixture after a monomer conversion of at least 5 percent, at least 10 percent, at least 20 percent, at least 50 percent, or at least 80 percent has been achieved. In these or other embodiments, the functionalizing agent can be added to the polymerization mixture before a monomer conversion of 90 percent, 70 percent, 50 percent, 20 percent, or 15 percent is achieved. In one or more embodiments, the functionalizing agent can be added after complete, or substantially complete, monomer conversion has been achieved. In one or more embodiments, a functionalizing agent can be introduced to the polymerization mixture immediately prior to, together with, or after the introduction of a Lewis base, as disclosed in U.S. patent application Ser. No. 11/890,590, filed on Aug. 7, 2007, which is incorporated herein by reference in its entirety.

In one or more embodiments, the functionalizing agent can be introduced into the polymerization mixture at a location (e.g., within a vessel) where the polymerization (or at least a portion thereof) has been conducted. In other embodiments, the functionalizing agent can be introduced into the polymerization mixture at a location that is distinct from where the polymerization (or at least a portion thereof) has taken place. For example, the functionalizing agent can be introduced to the polymerization mixture in downstream vessels including, but not limited to, downstream reactors or tanks, in-line reactors or mixers, extruders, or devolatilizers.

Once a functionalizing agent, if employed, has been introduced to the polymerization mixture and a desired reaction time has been provided, a quenching agent can be added to the polymerization mixture in order to inactivate any residual reactive polymer chains and the catalyst or catalyst components. The quenching agent can be a protic compound, which includes, but is not limited to, an alcohol, a carboxylic acid, an inorganic acid, water, or a mixture thereof. In one or more embodiments, the quenching agent comprises a polyhydroxy compound, such as those described in U.S. patent application Ser. No. 11/890,591, filed on Aug. 7, 2007, which is incorporated herein by reference in its entirety.

In one or more embodiments, an antioxidant, such as, for example, 2,6-di-t-butyl-4-methylphenol, may be added along with, before, or after the addition of the quenching agent. The amount of antioxidant employed can be in the range of about 0.2 to about 1 percent by weight of the polymer product. The quenching agent and the antioxidant can be added as neat materials or dissolved in a hydrocarbon solvent or conjugated diene monomer prior to being added to the polymerization mixture.

Once the polymerization mixture has been quenched, the various constituents of the polymerization mixture can be recovered. In one or more embodiments, the unreacted monomer can be recovered from the polymerization mixture. For example, the monomer can be distilled from the polymerization mixture by using techniques known in the art. In one or more embodiments, a devolatilizer can be employed to remove at least a portion of the monomer from the polymerization mixture. Once the monomer has been removed from the polymerization mixture, the monomer can be purified, stored, and/or recycled back to the polymerization process.

The resulting polymer product can be recovered from the polymerization system using techniques known in the art. In one or more embodiments, desolventization and drying techniques can be used. For instance, the polymer can be recovered by passing the polymerization mixture through a heated screw apparatus, such as a desolventizing extruder, in which the volatile substances are removed by evaporation at appropriate temperatures (e.g., about 100 to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Where cis-1,4-polydienes (e.g., cis-1,4-polybutadiene) are produced by one or more embodiments of the process of this invention, the cis-1,4-polydienes can have a cis-1,4-linkage content of at least 96 percent, at least 97 percent, at least 97.2 percent, or at least 97.4 percent, where the percentages are based upon the number of diene mer units adopting the cis-1,4-linkage versus the total number of diene mer units. Also, these polymers can have a 1,2-linkage content that is less than 7 percent, less than 5 percent, less than 2 percent, or less than 1 percent, where the percentages are based upon the number of diene mer units adopting the 1,2-linkage versus the total number of diene mer units. The balance of the diene mer units can adopt the trans-1,4-linkage. The cis-1,4-, 1,2-, and trans-1,4-linkage content of the polydienes can be determined by infrared spectroscopy.

In one or more embodiments, the polydienes prepared according to the methods described herein can have a number average molecular weight ("$M_n$") in the range of from about 10,000 to about 500,000, in the range of from about 50,000 to about 250,000, or in the range of from 90,000 to 180,000. Additionally, the polydienes can have a weight average molecular weight ("$M_w$") in the range of from about 100,000 to about 800,000, in the range of from about 200,000 to about 600,000, or in the range of from about 300,000 to about 450,000. As mentioned above, a nickel-containing component can optionally be employed in the above-described catalyst systems to control the molecular weight of the resulting polydiene. Accordingly, in one embodiment, the $M_n$ of the cis-1,4-polydienes can be in the range of from about 5,000 to about 150,000, in the range of from about 10,000 to about 80,000, or in the range of from 20,000 to 50,000. The polydispersity ("$M_w/M_n$") of the polydienes prepared according to one or more embodiments of the present invention can be in the range of from about 1.5 to about 5.0, or from 2.0 to 4.0. The $M_n$, $M_w$, and $M_w/M_n$ are determined by gel permeation chromatography ("GPC") calibrated with polystyrene standards and Mark-Houwink constants for the polymer in question.

The polydienes prepared according to the present invention exhibit excellent viscoelastic properties and can be useful in the manufacture of various tire components including, but not limited to, tire treads, sidewalls, subtreads, and bead fillers. The polydienes can be used as all or part of the elastomeric component of a tire stock. When the polydienes are used in conjunction with other rubbers to form the elastomeric component of a tire stock, these other rubbers can be natural rubber, synthetic rubbers, or mixtures thereof. Examples of synthetic rubber useful in the present invention include, but are not limited to, polyisoprene, poly(styrene-co-butadiene), polybutadiene with low cis-1,4-linkage content, poly(styrene-co-butadiene-co-isoprene), and mixtures thereof The polydienes can also be used in the manufacture of hoses, belts, shoe soles, window seals, other seals, vibration damping rubber, and other industrial products.

This invention can be further illustrated by the following examples of embodiments thereof, although it will be understood that these examples are included merely for purposes of illustration and are not intended to limit the scope of the invention unless otherwise specifically indicated.

EXAMPLES

Example 1

Control Polydiene

Polymerization of 1,3-butadiene was conducted using a catalyst system comprising neodymium versatate ("NdV"), triisobutylaluminum ("TIBA"), and ethylaluminum dichloride ("EADC") to prepare a control sample of cis-1,4-polybutadiene according to the following method. An oven-dried 800-mL glass bottle was capped with a self-sealing rubber liner and a perforated metal cap. After the bottle was thoroughly purged with a stream of dry nitrogen, the bottle was charged with 106 g of hexane and 227 g of a 1,3-butadiene/hexane blend containing 22.0 percent by weight of 1,3-butadiene to yield a 1,3-butadiene/hexane blend comprising 15 percent by weight 1,3-butadiene. The following catalyst ingredients were then charged into the bottle in the following order: (1) 3.00 ml of 0.68 M TIBA in hexane, (2) 0.90 ml of 0.0944 M NdV in cyclohexane, and (3) 0.80 ml of 0.159 M EADC in hexane. The bottle was tumbled for 50 minutes in a water bath maintained at 80° C. The polymerization was then terminated by addition of 3 ml of 12 percent by weight 2,6-di-tert-butyl-4-methylphenol solution in isopropanol. The resulting polymer cement was coagulated with 2 liters of isopropanol containing 0.5 g of 2,6-di-tert-butyl-4-methylphenol and then drum-dried. The yield of the polymer was 48.6 g. The Mooney viscosity ("$ML_{1+4}$") of the resulting polymer was determined to be 62.8 at 100° C. by using an Alpha Technologies Mooney viscometer with a large rotor, a one-minute warm-up time, and a four-minute running time. As determined by gel permeation chromatography ("GPC"), the polymer had a number average molecular weight ("$M_n$") of 133,500, a weight average molecular weight ("$M_w$") of 362,800, and a molecular weight distribution ("$M_w/M_n$") of 2.72. The infrared spectroscopic analysis of the polymer indicated a cis-1,4-linkage content of 97.16 percent, a trans-1,4-linkage content of 2.01 percent, and a 1,2-linkage content of 0.83 percent. The properties of the polymer are summarized in Table 1.

Examples 2-4

Effect of N,N-Diethylhydroxylamine on Conjugated Diene Polymerization

Three cis-1,4-polybutadiene samples were prepared in the same manner as described in Example 1, with the exception that various amounts of N,N-diethylhydroxylamine ("DEHA") were included in the catalyst system. The catalyst ingredients were added to the 1,3-butadiene monomer solution in bottles in the following order: (1) DEHA, (2) TIBA, (3) NdV, and (4) EADC. The amounts of neat DEHA used in Examples 2-4 were 3.84, 5.76, and 7.68 microliters, respectively, in order to vary the molar ratio of DEHA to NdV. The corresponding molar ratios of DEHA to NdV employed in Examples 2-4, along with the monomer conversion and resultant polymer properties, are reported in Table 1, below.

TABLE 1

Effect of N,N-Diethylhydroxylamine on Conjugated Diene Polymerization

| | Example | | | |
|---|---|---|---|---|
| | 1 (control) | 2 | 3 | 4 |
| DEHA/NdV molar ratio | 0:1 | 0.44:1 | 0.66:1 | 0.88:1 |
| Monomer Conversion (%) | 97.3 | 97.2 | 96.8 | 96.9 |
| Mooney Viscosity at 100° C. | 62.8 | 63.5 | 62.1 | 63.8 |
| $M_n$ | 133,500 | 131,300 | 128,800 | 127,100 |
| $M_w$ | 362,800 | 386,900 | 391,300 | 392,800 |
| $M_w/M_n$ | 2.72 | 2.95 | 3.04 | 3.09 |
| Cis-1,4-linkage (%) | 97.16 | 97.42 | 97.54 | 97.61 |
| Trans-1,4-linkage (%) | 2.01 | 1.71 | 1.63 | 1.54 |
| 1,2-linkage (%) | 0.83 | 0.87 | 0.83 | 0.85 |

As can be seen from the results listed in Table 1, the addition of DEHA to the catalyst system is effective in increasing the cis-1,4-linkage of the resulting polybutadiene. Additionally, the use of DEHA does not adversely affect the catalyst system's activity, which is apparent given that the monomer conversions in Examples 2-4 were comparable to the monomer conversion in Example 1.

Various modifications and alterations that do not depart from the scope and spirit of this invention will become apparent to those skilled in the art. This invention is not to be unduly limited to the illustrative embodiments set forth herein.

What is claimed is:

1. A catalyst system comprising:
   (a) at least one lanthanide-containing compound;
   (b) at least one alkylating agent;
   (c) at least one halogen source; and
   (d) at least one N,N-dihydrocarbylhydroxylamine,
   wherein at least a portion of said halogen source is present as a halogen-containing compound that is distinct from said lanthanide-containing compound and said alkylating agent,
   wherein said halogen-containing compound comprises one or more labile halogen atoms.

2. The catalyst system of claim 1, wherein said N,N-dihydrocarbylhydroxylamine has a structure selected from the group consisting of:

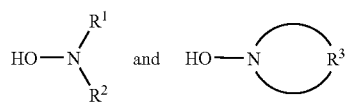

wherein $R^1$ and $R^2$ are each independently hydrocarbyl or substituted hydrocarbyl groups,
wherein $R^3$ is a hydrocarbylene or substituted hydrocarbylene group.

3. The catalyst system of claim 2, wherein $R^1$ and $R^2$ is each independently an alkyl, cycloalkyl, alkenyl, cycloakenyl, aryl, allyl, aralkyl, alkaryl, or alkynyl group, wherein $R^3$ is an alkylene, cycloalkylene, alkenylene, cycloalkenylene, alkynylene, cycloalkynylene, or arylene group.

4. The catalyst system of claim 1, wherein said N,N-dihydrocarbylhydroxylamine is selected from the group consisting of N,N-dimethylhydroxylamine, N,N-diethylhydroxylamine, N,N-di-n-propylhydroxylamine, N,N-diisopropylhydroxylamine, N,N-di-n-butylhydroxylamine, N,N-diisobutylhydroxylamine, N,N-di-t-butylhydroxylamine, N,N-di-n-hexylhydroxylamine, N,N-di-n-octylhydroxylamine, N,N-bis (2-ethylhexyl)hydroxylamine, N,N-dicyclopentylhydroxylamine, N,N-dicyclohexylhydroxylamine, N,N-diphenylhydroxylamine, N,N-di-p-tolylhydroxylamine, 1-hydroxypyrrolidine, 1-hydroxypiperidine, 4-hydroxymorpholine, 1-hydroxyhomopiperidine, 1-hydroxy-4-methylpiperazine, 1-hydroxy-4-methylhomopiperazine, and mixtures of two or more thereof.

5. The catalyst system of claim 1, wherein said N,N-dihydrocarbylhydroxylamine comprises N,N-diethylhydroxylamine.

6. The catalyst system of claim 1, wherein the molar ratio of said N,N-dihydrocarbylhydroxylamine to said lanthanide-containing compound is in the range of from about 0.01:1 to about 10:1.

7. The catalyst system of claim 1, wherein the molar ratio of said alkylating agent to said lanthanide-containing compound is in the range of from about 1:1 to about 200:1.

8. The catalyst system of claim 1, wherein the molar ratio of said halogen source to said lanthanide-containing compound is in the range of from about 0.5:1 to about 20:1.

9. The catalyst system of claim 1, wherein the molar ratio of said N,N-dihydrocarbylhydroxylamine to said lanthanide-containing compound is in the range of from about 0.05:1 to about 5:1, wherein the molar ratio of said alkylating agent to said lanthanide-containing compound is in the range of from about 2:1 to about 100:1, wherein the molar ratio of said halogen source to said lanthanide-containing compound is in the range of from about 1:1 to about 10:1.

10. The catalyst system of claim 1, wherein said lanthanide-containing compound comprises neodymium.

11. The catalyst system of claim 1, wherein said lanthanide-containing compound is selected from the group consisting of a neodymium carboxylate, neodymium organophosphate, neodymium organophosphonate, neodymium organophosphinate, neodymium carbamate, neodymium dithiocarbamate, neodymium xanthate, neodymium β-diketonate, neodymium alkoxide or aryloxide, neodymium halide, neodymium pseudo-halide, neodymium oxyhalide, organoneodymium compound, and mixtures of two or more thereof.

12. The catalyst system of claim 1, wherein said alkylating agent comprises an organoaluminum compound represented by the formula $AlR_nX_{3-n}$, wherein each R independently is a mono-valent organic group attached to the aluminum atom via a carbon atom, wherein each X independently is a hydrogen atom, a halogen atom, a carboxylate group, an alkoxide group, or an aryloxide group, and wherein n is an integer in the range of from 1 to 3 inclusive.

13. The catalyst system of claim 1, wherein said lanthanide-containing compound and/or said alkylating agent comprises at least one labile halogen atom, wherein said lanthanide-containing compound and/or said alkylating agent additionally serves as at least a portion of said halogen source.

14. The catalyst system of claim 1, wherein said halogen-containing compound is selected from the group consisting of elemental halogens, mixed halogens, hydrogen halides, organic halides, inorganic halides, metallic halides, organometallic halides, and mixtures of two or more thereof.

15. The catalyst system of claim 1, further comprising a carrier fluid selected from the group consisting of an organic solvent, a monomer, and mixtures thereof.

16. A process for preparing a polydiene, said process comprising: polymerizing at least one conjugated diene monomer in a polymerization system comprising said conjugated diene monomer and a catalyst system to thereby produce said polydiene, wherein said catalyst system comprises at least one lanthanide-containing compound, at least one alkylating agent, at least one halogen source, and at least one N,N-dihydrocarbylhydroxylamine, wherein at least a portion of said halogen source is present as a halogen-containing compound that is distinct from said lanthanide-containing compound and said alkylating agent, wherein said halogen-containing compound comprises one or more labile halogen atoms.

17. The process of claim 16, wherein said lanthanide-containing compound is present in said polymerization system in an amount in the range of from about 0.01 to about 2 mmol per 100 g of said conjugated diene monomer.

18. The process of claim 16, wherein the molar ratio of said N,N-dihydrocarbylhydroxylamine to said lanthanide-containing compound is in the range of from about 0.01:1 to about 10:1.

19. The process of claim 16, wherein the molar ratio of said alkylating agent to said lanthanide-containing compound is in the range of from about 1:1 to about 200:1.

20. The process of claim 16, wherein the molar ratio of said halogen source to said lanthanide-containing compound is in the range of from about 0.5:1 to about 20:1.

21. The process of claim 16, wherein the molar ratio of said N,N-dihydrocarbylhydroxylamine to said lanthanide-containing compound is in the range of from about 0.05:1 to about 5:1, wherein the molar ratio of said alkylating agent to said lanthanide-containing compound is in the range of from about 2:1 to about 100:1, wherein the molar ratio of said halogen source to said lanthanide-containing compound is in the range of from about 1:1 to about 10:1.

22. The process of claim 16, wherein said conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and mixtures of two or more thereof.

23. The process of claim 16, wherein said conjugated diene monomer comprises 1,3-butadiene.

24. The process of claim 16, wherein said polydiene comprises a cis-1,4-linkage content of at least 96 percent.

25. The process of claim 16, wherein said N,N-dihydrocarbylhydroxylamine has a structure selected from the group consisting of:

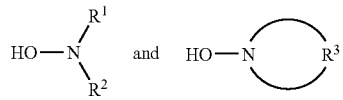

wherein $R^1$ and $R^2$ are each independently hydrocarbyl or substituted hydrocarbyl groups,
wherein $R^3$ is a hydrocarbylene or substituted hydrocarbylene group.

26. The process of claim 16, wherein said N,N-dihydrocarbylhydroxylamine is selected from the group consisting of N,N-dimethylhydroxylamine, N,N-diethylhydroxylamine, N,N-di-n-propylhydroxylamine, N,N-diisopropylhydroxylamine, N,N-di-n-butylhydroxylamine, N,N-diisobutylhydroxylamine, N,N-di-t-butylhydroxylamine, N,N-di-n-hexylhydroxylamine, N,N-di-n-octylhydroxylamine, N,N-bis(2-ethylhexyl)hydroxylamine, N,N-dicyclopentylhydroxylamine, N,N-dicyclohexylhydroxylamine, N,N-diphenylhydroxylamine, N,N-di-p-tolylhydroxylamine, 1-hydroxypyrrolidine, 1-hydroxypiperidine, 4-hydroxymorpholine, 1-hydroxyhomopiperidine, 1-hydroxy-4-methylpiperazine, 1-hydroxy-4-methylhomopiperazine, and mixtures of two or more thereof.

27. The process of claim 16, wherein said lanthanide-containing compound is selected from the group consisting of a neodymium carboxylate, neodymium organophosphate, neodymium organophosphonate, neodymium organophosphinate, neodymium carbamate, neodymium dithiocarbamate, neodymium xanthate, neodymium β-diketonate, neodymium alkoxide or aryloxide, neodymium halide, neodymium pseudo-halide, neodymium oxyhalide, organoneodymium compound, and mixtures of two or more thereof.

28. The process of claim 16, wherein said alkylating agent comprises an organoaluminum compound represented by the formula $AlR_nX_{3-n}$, wherein each R independently is a monovalent organic group attached to the aluminum atom via a carbon atom, wherein each X independently is a hydrogen atom, a halogen atom, a carboxylate group, an alkoxide group, or an aryloxide group, and wherein n is an integer in the range of from 1 to 3 inclusive.

29. The process of claim 16, wherein said halogen-containing compound is selected from the group consisting of elemental halogens, mixed halogens, hydrogen halides, organic halides, inorganic halides, metallic halides, organometallic halides, and mixtures of two or more thereof.

30. The process of claim 16, wherein said polymerizing comprises bulk polymerization.

31. The process of claim 16, wherein said polymerizing comprises solution or precipitation polymerization.

32. The process of claim 16, wherein said polymerization system further comprises at least one organic solvent.

33. The process of claim 16, wherein said polymerizing is performed at a temperature in the range of from about −10 to about 200° C.

* * * * *